(12) United States Patent
Basu

(10) Patent No.: US 9,023,310 B1
(45) Date of Patent: May 5, 2015

(54) AQUEOUS PROCESS FOR RECOVERING SULFUR FROM HYDROGEN SULFIDE-BEARING GAS

(71) Applicant: Arunabha Basu, Aurora, IL (US)

(72) Inventor: Arunabha Basu, Aurora, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 14/262,216

(22) Filed: Apr. 25, 2014

(51) Int. Cl.
*C01B 17/05* (2006.01)
*C10L 3/10* (2006.01)
*B01D 53/52* (2006.01)

(52) U.S. Cl.
CPC ..................................... *B01D 53/52* (2013.01)

(58) Field of Classification Search
USPC .......... 423/574.1, 576.4, 576.5, 576.6, 576.7; 48/127.3, 127.5, 127.7
See application file for complete search history.

(56) References Cited

U.S. PATENT DOCUMENTS

| | | | | |
|---|---|---|---|---|
| 2,563,437 | A * | 8/1951 | Townsend et al. | 423/576.4 |
| 3,071,433 | A * | 1/1963 | Dunn | 423/224 |
| 4,919,914 | A * | 4/1990 | Smith et al. | 423/576.2 |
| 5,928,620 | A | 7/1999 | Lynn | |
| 7,381,393 | B2 | 6/2008 | Lynn | |
| 7,550,132 | B2 * | 6/2009 | De Angelis et al. | 423/574.1 |
| 8,241,603 | B1 | 8/2012 | Basu et al. | |
| 8,298,505 | B2 * | 10/2012 | Zhai et al. | 423/574.1 |

* cited by examiner

*Primary Examiner* — Timothy Vanoy
(74) *Attorney, Agent, or Firm* — Pauley Petersen & Erickson

(57) ABSTRACT

A process for recovering sulfur from a hydrogen sulfide-bearing gas utilizes an aqueous reaction medium, a temperature of about 110-150° C., and a high enough pressure to maintain the aqueous reaction medium in a liquid state. The process reduces material and equipment costs and addresses the environmental disadvantages associated with known processes that rely on high boiling point organic solvents.

21 Claims, 2 Drawing Sheets

AQUEOUS PROCESS FOR RECOVERING SULFUR FROM HYDROGEN SULFIDE-BEARING GAS

This invention was made with government support under Contract No. DE-FE0011958 awarded by the United States Department of Energy. The government has certain rights in the invention.

FIELD OF THE INVENTION

This invention is directed to a process for removing sulfur from a hydrogen sulfide-bearing gas in which the chemical reaction is carried out in an aqueous medium.

BACKGROUND OF THE INVENTION

Hydrogen sulfide gas is both a contaminant and a pollutant found in natural gas and various industrial gases. In order to prevent emission of hydrogen sulfide gas, which carries the foul odor of rotten eggs and is poisonous, corrosive and flammable, various processes have been developed. Some processes react hydrogen sulfide with sulfur dioxide to yield elemental sulfur (which can be recovered) and water, according to the following reaction:

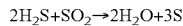

$$2H_2S + SO_2 \rightarrow 2H_2O + 3S$$

The sulfur dioxide can be produced by the combustion of sulfur, suitably including sulfur that is generated in the reaction of hydrogen sulfide with sulfur dioxide. The end result can be a treated natural gas or treated industrial gas emission that is substantially free of both hydrogen sulfide and sulfur dioxide.

U.S. Pat. No. 7,381,393, issued to Lynn, discloses a process for removing hydrogen sulfide (and thus sulfur) from a gas by reaction in a high boiling point organic liquid medium, under heat, with sulfur dioxide. The disclosed process includes the steps of reacting a hydrogen sulfide-containing gas stream with a stoichiometric excess of sulfur dioxide in a reactor to produce a sulfur dioxide-containing gas and liquid sulfur, using an organic liquid medium and a temperature exceeding the melting point of sulfur; withdrawing liquid sulfur from the reactor; withdrawing the sulfur dioxide-containing gas from the reactor; removing the sulfur dioxide from the gas; and recycling the sulfur dioxide for use in the first step of the process.

U.S. Pat. No. 5,928,620, issued to Lynn, discloses an earlier process for removing elemental sulfur from a hydrogen sulfide-containing gas. The process includes the steps of passing the hydrogen sulfide-containing gas through a hydrogen sulfide absorber to obtain a gas having a diminished amount of hydrogen sulfide, stripping the hydrogen sulfide out of the resulting hydrogen sulfide-rich solution to obtain a hydrogen sulfide-rich gas, feeding the hydrogen sulfide-rich gas an sulfur dioxide into a reactor, reacting the hydrogen sulfide and sulfur dioxide to convert about 50% of the hydrogen sulfide to sulfur dioxide and water, combusting the remaining hydrogen sulfide to yield sulfur dioxide, and feeding the sulfur dioxide back into the reactor.

The foregoing processes typically carry out the chemical reaction in a liquid reaction medium using a high boiling organic solvent at a temperature of about 115-150° C. at a pressure that is near or slightly above atmospheric pressure. Examples of suitable organic solvents include diethylene glycol methyl ether ("DGM"), triethylene glycol methyl ether, triethylene glycol dimethyl ether, polyethylene glycol dimethyl ether, and other polyglycol ethers. The use of these solvents contributes significant cost and complexity to the process. Not only are the solvent costs high, but care must be taken to ensure that the solvent vapors are not discharged into the atmosphere and do not leave the reactor with the hydrogen sulfide-depleted gas.

SUMMARY OF THE INVENTION

The present invention is directed to a process for removing sulfur from a hydrogen sulfide-containing gas. The process includes the steps of supplying an aqueous solvent composed primarily of water into a reactor; heating the aqueous solvent to a temperature of at least about 110° C.; applying at least about 2 atmospheres of pressure (absolute) to the reactor; supplying sulfur dioxide into the reactor; supplying a hydrogen sulfide-containing gas into the reactor; chemically reacting the hydrogen sulfide with the sulfur dioxide to yield elemental sulfur, water, and hydrogen sulfide-depleted gas; recovering the elemental sulfur form the reactor; and recovering the hydrogen sulfide-depleted gas from the reactor. The reactor is suitably an elongated column reactor which facilitates the settling and removal of elemental sulfur from an outlet near the bottom. The solvent temperature and pressure can be higher, and the solvent can be composed of up to 100% water with no organic component. Two or more reactors can be arranged in stages to reach a desired low level of hydrogen sulfide and sulfur dioxide in the exit gas stream.

The invention addresses many of the foregoing challenges associated with the use of organic solvents by replacing the organic solvents primarily with water. The solvent amount and the applied pressure are adjusted as needed to facilitate dissolution of the hydrogen sulfide and sulfur dioxide in aqueous solvent, and to maintain the aqueous solvent substantially in a liquid state of the elevated reaction temperatures.

With the foregoing in mind, it is a feature and advantage of the invention to provide a process for removing hydrogen sulfide from a hydrogen sulfide-containing gas that reduces the costs and complexity associated with conventional processes that rely on organic solvents for the reaction medium. The foregoing and other features and advantages will become further apparent from the following detailed description of the invention, read in conjunction with the drawings.

DETAILED DESCRIPTION OF THE INVENTION

Figure 1:
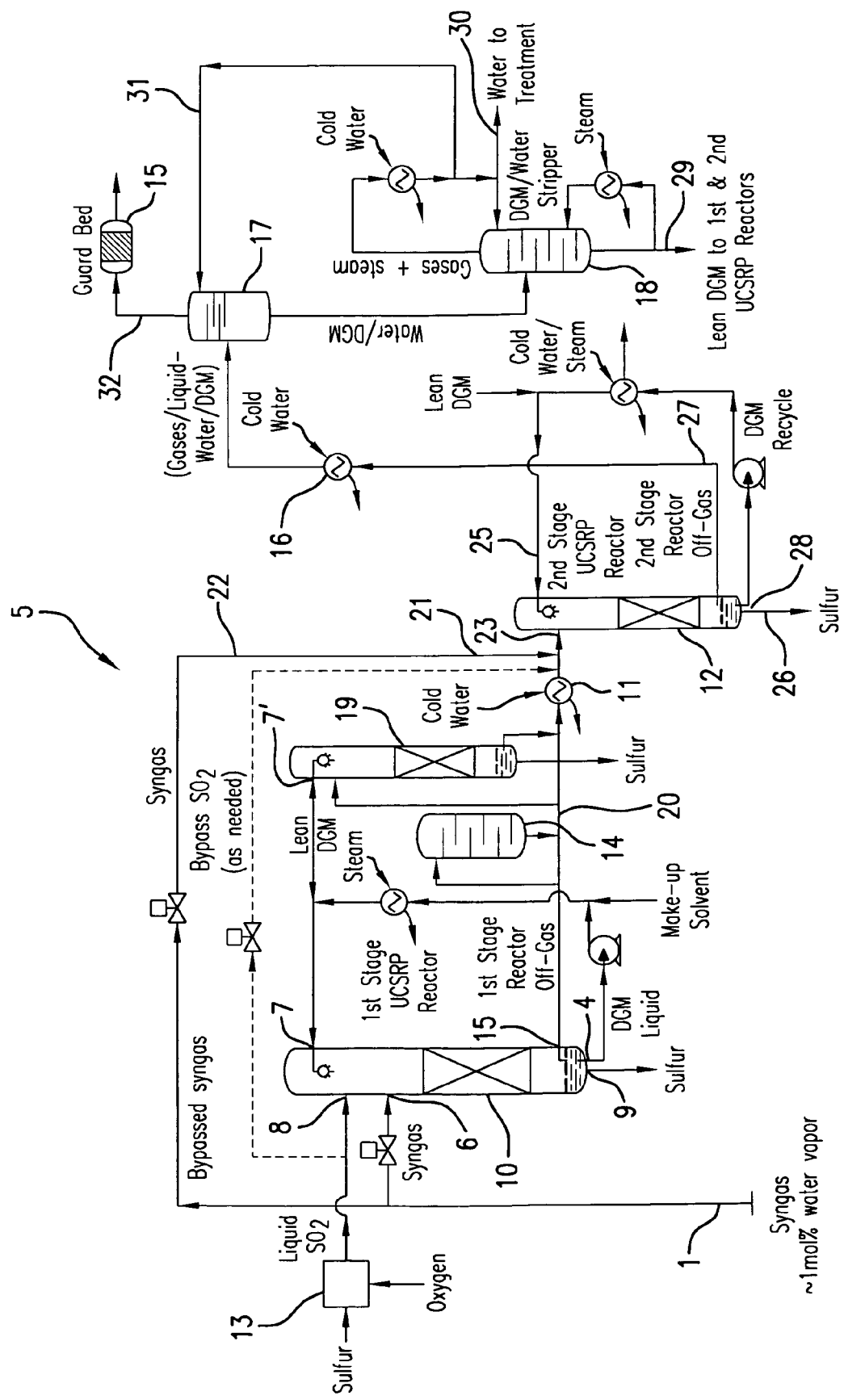
FIG. 1 schematically illustrates a two-stage prior art process for removing sulfur from a hydrogen sulfide-containing gas as described in U.S. Pat. No. 8,241,603, issued to Basu et al.

In order to better illustrate features and advantages of the invention, the invention will be described by way of comparison to the prior art process described in U.S. Pat. No. 8,241,603, issued to Basu et al., the disclosure of which is incorporated herein by reference. Referring to FIG. 1, the prior art process 5 for removing sulfur from a hydrogen sulfide-containing gas includes first stage and second stage UCSRP reactors 10 and 12. As used herein, the term "UCSRP" refers to the University of California Sulfur Recovery Process concept for removing sulfur from natural gas and various other hydrogen sulfide-containing gaseous streams, further described in U.S. Pat. No. 7,381,393, issued to Lynn, the disclosure of which is incorporated herein by reference.

Hydrogen sulfide-containing gas from an upstream process (referred to as "syngas") is fed to a first inlet 6 of USCRP reactor 10 which is an elongated column-type reactor. Liquid organic solvent, in this case diethylene glycol methyl ether ("DGM") is fed to a second inlet 7. Liquid sulfur dioxide produced by the combustion of sulfur with oxygen in furnace 13 is fed to the third inlet 8 of reactor 10. The first stage reactor 10 operates using a stoichiometric excess of sulfur dioxide, meaning there is more than enough sulfur dioxide to carry out the reaction with hydrogen sulfide according to the following equation:

$$2H_2S+SO_2 \rightarrow 2H_2O+3S$$

The chemical reaction proceeds at elevated temperature (for example, about 120° C.), and is exothermic. The reactor 10 and/or the solvent is heated and/or cooled as necessary to maintain the desired temperature of the solvent. Elemental sulfur exits the reactor 10 through outlet 9 and some of the organic solvent exits through an outlet 4 where it is combined with a make-up solvent stream 13, heated and recycled to the reactor 10. The hydrogen sulfide-depleted gas having a much reduced hydrogen sulfide content (for example, less than 100 ppmv) leaves the reactor 10 through outlet 15.

The hydrogen sulfide-depleted gas from the first reactor 10 (referred to as 1st stage reactor off-gas) may include some carbonyl sulfide ("COS") formed from the excess sulfur dioxide and may be directed to a COS hydrolysis reactor 14 to convert the COS and water vapor to carbon dioxide and hydrogen sulfide. The hydrogen sulfide-depleted gas (stream 20) can optionally pass through an intermediate UCSRP reactor 19 which operates using organic solvent (stream 7'), residual sulfur dioxide and hydrogen sulfide generated by hydrolysis reactor 14, to further reduce the hydrogen sulfide content of the stream 20 (for example, to 1-3 ppmv) and similarly deplete residual sulfur dioxide from the stream 20. The hydrogen sulfide-depleted gas stream 20 can then proceed to the inlet 23 of the second stage UCSRP reactor 12, either alone or mixed with an additional quantity of syngas (stream 21).

The second stage reactor 12 includes inlet 23 for the hydrogen sulfide-depleted gas from the first stage reactor 12 (with or without additional syngas), inlet 25 for the organic solvent, outlet 26 for elemental sulfur, outlet 28 for solvent recycling, and outlet 27 for the second stage hydrogen sulfide-depleted gas, which can be referred to as super hydrogen-sulfide depleted gas or product gas, and has very low concentrations of hydrogen sulfide and sulfur dioxide of typically less than 1 ppmv, or less than 50 ppbv. If needed, sulfur dioxide (stream 22) can be combined with the stream 20 before entering the second stage reactor 12, or can be fed directly to the second stage reactor 12. The second stage reactor 12 operates under temperature and pressure conditions similar to the first stage reactor 10, for example, about 120° C. and pressures near or above atmospheric, often driven by the high pressure at the source of hydrogen sulfide-containing gas (stream 1).

In the prior art process, the product gas from the second stage reactor 12 is chilled in cooler 16 in preparation for a separation step in a high pressure separator vessel 17 which removes major fractions of organic solvent and water from the product gas. The organic solvent and water are directed to stripper 18 to remove the solvent from the water for recycling (stream 29) and to remove the water for further treatment (stream 30). Any product gas recovered from the stripper 18 can be combined with product gas from the stripper 17 (streams 31, 32) and passed through a guard bed 15 for discharge and/or use.

Figure 2:
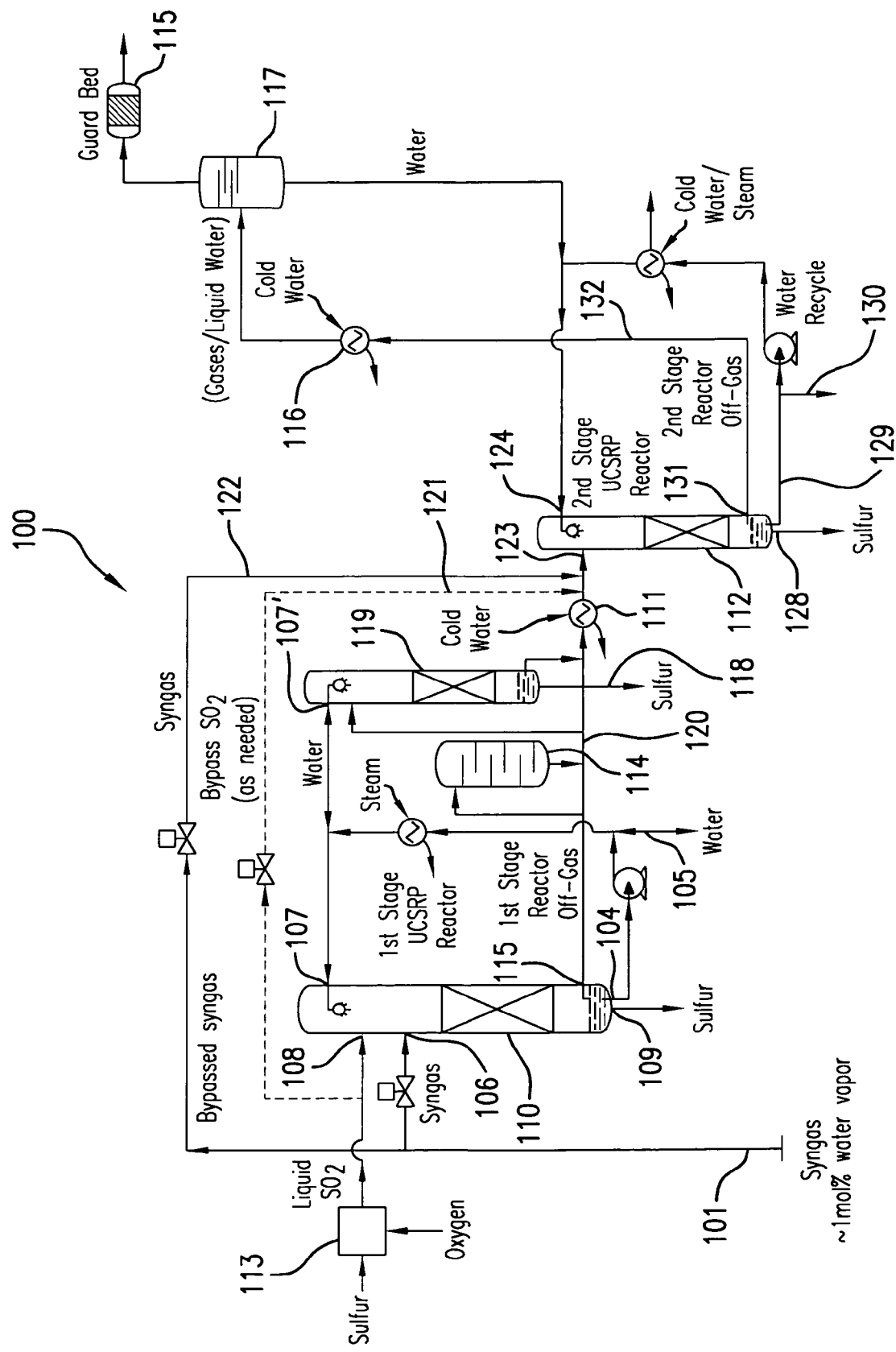
FIG. 2 schematically illustrates a two-stage process of the invention for removing sulfur from a hydrogen sulfide-containing gas.

By using water as the only solvent, or as a primary or substantial component of the solvent, the complexities associated with organic solvent separation, removal and recycling can be eliminated or significantly reduced. FIG. 2 schematically illustrates a process 100 for removing sulfur from a hydrogen sulfide-containing gas, using an aqueous solvent. The aqueous solvent is composed primarily of water, suitably at least about 75% by weight water, or at least about 85% by weight water, or at least about 95% by weight water, or about 100% by weight water. The aqueous solvent is supplied to the first stage elongated column reactor 110 via inlet 107, and is heated to a temperature of at least about 110° C., suitably at least about 115° C., or about 120-150° C., either before or upon entry to the reactor 110. Sufficient pressure is applied to the first stage reactor 110, and to the aqueous solvent in the reactor 110, to maintain the aqueous solvent in a liquid state. The desired amount of pressure will depend on whether the aqueous solvent is all water, or is a mixture of water and other (e.g. organic) solvent, and its precise composition, as well as the precise reaction temperature. The absolute pressure will suitably be at least about 2 atmospheres, or at least about 10 atmospheres, or about 20 to about 100 atmospheres, or about 30 to about 80 atmospheres.

The hydrogen sulfide-containing gas (syngas), which can be a natural gas or an industrial tailgas, is supplied to the reactor 110 via inlet 106 from a source 101. The hydrogen sulfide-containing gas at source 101 is often provided under very high pressure, and can be used to provide the pressure needed inside the reactor 110. For example, hydrogen sulfide-containing natural gas can be supplied at its pipeline pressure, which can be about 60-80 atmospheres. The desired pressure in the reactor 110 can also be facilitated by supplying the aqueous solvent under pressure using a suitable high pressure liquid pump.

A stoichiometric excess of sulfur dioxide, which can be produced in a sulfur-burning furnace 113, is supplied to the reactor 110 through inlet 108. For instance, the sulfur dioxide may be supplied in an amount that is about 105-120% of the amount needed to complete the chemical reaction with hydrogen sulfide. The amount of aqueous solvent supplied to the reactor 110 must be high enough to dissolve the hydrogen sulfide at the reaction conditions. Sulfur dioxide is more soluble in water than in a typical organic solvent such as DGM. However, hydrogen sulfide is less soluble in water. At an exemplary reaction condition of 123° C. and 52 atmospheres of pressure, a solvent to gas ratio of about 2.6 is needed to dissolve hydrogen sulfide (and is more than sufficient to dissolve a stoichiometric excess of sulfur dioxide). If the aqueous solvent is a combination of primarily water and a standard organic solvent such as DGM, a lower liquid to gas ratio may be required. Generally, the liquid to gas ratio should be about 1.8 to about 3.0 for aqueous solvents used with the invention.

If the aqueous solvent includes a minor organic component, the organic component may include without limitation diethylene glycol methyl ether (DGM), triethylene glycol methyl ether, polyethylene glycol methyl ether, and other polyglycol ethers. The solvent may be combined with a catalyst, suitably a homogeneous catalyst that dissolves in the solvent at the reaction temperature and pressure. Suitable catalysts include tertiary amines, particularly lower alkyl substituted tertiary amines, lower alkyl and aryl substituted tertiary amines, and aryl substituted tertiary amines, including those where the amine nitrogen is in an aromatic ring.

Examples of non-aromatic tertiary amines include N,N-dimethylaniline, triethylamine, tri-n-butyl amine, and mixed trialkylamines. Preferred liquid phase catalysts include pyridine and isoquinoline, optionally substituted at one or more sites other than carbon atoms adjacent to the ring nitrogen with a polar group. Suitable polar substituents include hydroxyl, hydroxyalkyl, acetamido, acetamido alkyl, acetyl, acetylalkyl, acetyloxy, acetyloxyalkyl, alkoxy, alkoxyalkyl, amino, alkylamino, and aminoalkyl groups. The catalyst can be dissolved in the solvent in an amount of about 0.01-2% by weight.

The hydrogen sulfide and sulfur dioxide react to yield elemental sulfur and water. The elemental sulfur is recovered from the elongated column reactor via outlet 109 and can be directed to the furnace 113 for burning and conversion to sulfur dioxide. Water is recovered from the reactor through outlet 104 and can be recycled back to inlet 107 for use in the aqueous solvent. Because the chemical reaction produces water, there will likely be an overall excess of water. Any excess of water can be discharged through outlet 105. The hydrogen sulfide-depleted gas is recovered from the reactor 110 via outlet 115, and has a substantially depleted hydrogen sulfide content. For example, the hydrogen sulfide-containing gas entering the elongated column reactor 110 may have a first hydrogen sulfide content of about 0.1% to about 20% by volume, typically about 1-10% by volume. The hydrogen sulfide-depleted gas exiting through outlet 105 can have a substantially reduced second hydrogen sulfide content of about 0.1 to about 100 ppmv.

The hydrogen sulfide-depleted gas can be directed through the COS hydrolysis reactor 14 to react any carbonyl sulfate with water vapor, yielding carbon dioxide and hydrogen sulfide. The hydrogen sulfide-depleted gas (stream 120) can optionally pass through an intermediate stage elongated column reactor 119 which operates with an aqueous solvent (stream 107"), residual sulfur dioxide and hydrogen sulfide generated by hydrolysis reactor 114 to further reduce the hydrogen sulfide content of stream 120 and similarly deplete residual sulfur dioxide from the stream 120. The elemental sulfur from the optional intermediate stage reactor 119 is discharged through outlet 118. The hydrogen sulfide-depleted gas stream 120 can then be chilled by cooler 111 and pass to inlet 123 of the second stage elongated column reactor 112, either alone or mixed with an additional quantity of hydrogen-sulfide-containing gas (stream 121) from the source 101.

The second stage elongated column reactor 112 can operate in much the same fashion as the first stage reactor 110 while reducing the hydrogen sulfide content in the hydrogen sulfide-depleted gas stream 120 to a much lower, super-depleted level that is less than 1 ppmv, suitably less than 100 ppbv, or less than 50 ppbv. Aqueous solvent, typically the same aqueous solvent used for the first stage reactor 110, is supplied to second stage reactor 112 via inlet 124. The aqueous solvent can carry the desired homogeneous catalyst. Sulfur dioxide can be supplied to the second stage reactor 112 via inlet 123 as part of the incoming hydrogen sulfide-depleted gas stream 120, and/or may be supplied from a source independent of the hydrogen-sulfide-depleted gas stream 120. Because the hydrogen sulfide content of stream 120 is already low, very little sulfur dioxide is needed at this stage unless a significant amount of the original hydrogen sulfide-containing gas is fed to the second stage reactor 112 via stream 122.

The solvent used in the second stage reactor 112 is heated to a temperature of at least about 110° C., suitably at least about 115° C., or about 120-150° C. before or upon entering the reactor. The interior of second stage reactor 112 is pressurized to an absolute pressure of at least about 2 atmospheres, or at least about 10 atmospheres, or about 20 to about 100 atmospheres, or about 30 to about 80 atmospheres. Because the hydrogen sulfide content of the entering gas stream is already quite low, the amount of aqueous solvent needed to dissolve the hydrogen sulfide and react it with sulfur dioxide is lower in the second stage reactor 112 than in the first stage reactor 110. Elemental sulfur exits the second stage reactor 112 through outlet 128. Water is recovered from outlet 129 and can be recycled in part to inlet 124, with any excess water being discharged at outlet 130.

The product gas, which can be referred to as super hydrogen sulfide-depleted gas or second stage hydrogen sulfide-depleted gas, is recovered from the second stage reactor 112 via outlet 131 and is carried by stream 132 through chiller 116 and separator 117. If the solvent is all water, then only the water is separated from the product gas at stripper 117. The separated water can then be recycled to inlet 124 of the second stage reactor 112, or discharged, and the product gas passes through guard bed 115 for discharge and/or further use. If the aqueous solvent contains any significant organic component in addition to water, then the more complex arrangement including a stripper 18 as shown in FIG. 1 may still not be needed because the combination of water and organic solvent can be recycled in its entirety to the inlet 124 of second stage reactor 112.

In summary, the process of the invention not only dramatically reduces the material cost by substituting water for most or all of the prior art organic solvents, but it also simplifies and reduces the equipment cost by eliminating the prior art stripper arrangement. While the process of the invention is illustrated in FIG. 2 as being practiced in two reactor stages (optionally with an additional intermediate stage), the process can be practiced in any number of reactor stages depending on the specific application. For example, the process can be practiced using a single reactor stage, or three or more stages, without departing from the scope of the invention.

The embodiments of the invention described herein are presently preferred. Various modifications and improvements can be made without departing from the spirit and scope of the invention. The scope of the invention is defined by the appended claims, and includes all changes that fall within the meaning and range of equivalents.

I claim:

1. A process for removing sulfur from a hydrogen sulfide-containing gas, comprising the steps of:
   supplying an aqueous solvent composed primarily of water into a reactor:
   heating the aqueous solvent to a temperature of at least about 110° C. applying at least about 2 atmospheres of pressure to the reactor;
   supplying sulfur dioxide into the reactor;
   supplying a hydrogen sulfide-containing gas into the reactor;
   chemically reacting the hydrogen sulfide with the sulfur dioxide to yield elemental sulfur, water and hydrogen sulfide-depleted gas;
   recovering the elemental sulfur from the reactor; and
   recovering the hydrogen sulfide-depleted gas from the reactor.

2. The process of claim 1, wherein the aqueous solvent comprises at least about 75% by weight water.

3. The process of claim 1, wherein the aqueous solvent comprises at least about 85% by weight water.

4. The process of claim 1, wherein the aqueous solvent comprises at least about 95% by weight water.

5. The process of claim 1, wherein the aqueous solvent is heated to a temperature of about 120° C. to about 150° C.

6. The process of claim 1, wherein the pressure is at least about 10 atmospheres.

7. The process of claim 1, wherein the pressure is at least about 20 to about 100 atmospheres.

8. The process of claim 1, wherein the pressure is at least about 30 to about 80 atmospheres.

9. The process of claim 1, further comprising the step of supplying a homogeneous catalyst into the reactor.

10. The process of claim 1, further comprising the step of burning the elemental sulfur recovered from the reactor to yield sulfur dioxide.

11. The process of claim 1, further comprising the step of cooling the hydrogen sulfide-depleted gas to remove solvent vapor.

12. The process of claim 1, further comprising the step of removing sulfur dioxide from the hydrogen sulfide-depleted gas.

13. A process for removing sulfur from a hydrogen sulfide-containing gas, comprising the steps of:
providing a first elongated column reactor having inlets, outlets and an interior;
supplying an aqueous solvent composed primarily of water to one of the inlets;
heating the aqueous solvent to a temperature of at least about 115° C.;
applying at least about 10 atmospheres of pressure to the interior;
supplying sulfur dioxide to one of the inlets;
supplying a hydrogen sulfide-containing gas having a first hydrogen sulfide content to one of the inlets;
chemically reacting the sulfur dioxide with the hydrogen sulfide in the interior to yield elemental sulfur, water, and a hydrogen sulfide-depleted gas having a second hydrogen sulfide content;
removing the elemental sulfur from the interior through a first of the outlets; and
removing the hydrogen sulfide-depleted gas through a second of the outlets.

14. The process of claim 13, wherein the aqueous solvent and hydrogen sulfide-containing gas are supplied to first and second of the outlets, respectively.

15. The process of claim 14, wherein the sulfur dioxide is supplied to a third of the inlets.

16. The process of claim 13, wherein the sulfur dioxide is supplied in a stoichiometric excess of an amount needed to chemically react with the hydrogen sulfide.

17. The process of claim 13, further comprising the steps of:
providing a second elongated column having inlets, outlets and an interior;
supplying an aqueous solvent composed primarily of water to one of the inlets of the second elongated column;
heating the aqueous solvent supplied to the second elongated column to a temperature of at least about 115° C.;
applying at least about 10 atmospheres of pressure to the interior of the second elongated column;
supplying the hydrogen sulfide-depleted gas from the first elongated column to an inlet of the second elongated column, the hydrogen sulfide-depleted gas having the second hydrogen sulfide content;
chemically reacting the hydrogen sulfide from the hydrogen sulfide-depleted gas with sulfur dioxide in the second elongated column to yield elemental sulfur, water and second stage hydrogen sulfide-depleted gas;
removing the elemental sulfur through a first of the outlets in the second elongated column; and
removing the second stage hydrogen sulfide-depleted gas through a second of the outlets in the second elongated column.

18. The process of claim 17, wherein the sulfur dioxide is supplied to the second elongated column as part of the hydrogen sulfide-depleted gas from the first elongated column.

19. The process of claim 17, wherein at least some of the sulfur dioxide is supplied to the second elongated column from a source independent of the hydrogen sulfide-depleted gas from the first elongated column.

20. The process of claim 17, wherein the second stage hydrogen sulfide-depleted gas has a lower sulfur dioxide content than the hydrogen sulfide-depleted gas.

21. A process of removing sulfur from a sulfur dioxide-containing gas, comprising the steps of
supplying an aqueous solvent containing at least about 80% by weight water into a reactor;
heating the aqueous solvent to a temperature of about 120° C. to about 150° C.;
applying about 30 to about 80 atmospheres of pressure to the reactor;
supplying sulfur dioxide into the reactor;
supplying a hydrogen sulfide-containing gas into the reactor;
chemically reacting the hydrogen sulfide with the sulfur dioxide to yield elemental sulfur, water, and hydrogen sulfide-depleted gas;
removing the elemental sulfur from the reactor;
removing the hydrogen sulfide-depleted gas from the reactor; and
removing excess water from the reactor.

* * * * *